(12) United States Patent
Manneschi

(10) Patent No.: US 6,452,481 B1
(45) Date of Patent: *Sep. 17, 2002

(54) APPARATUS AND OPERATIVE METHOD FOR DETECTION AND READING OF TRANSPONDERS IN A CONTROLLED PASSAGE

(76) Inventor: Alessandro Manneschi, 15, Via XXV Aprile, I-52100 Arezzo (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,441

(22) Filed: Nov. 27, 1998

(30) Foreign Application Priority Data

Jun. 30, 1998 (IT) .......................................... AR98A0020

(51) Int. Cl.[7] ................................................. H04Q 5/22
(52) U.S. Cl. ................................... 340/10.3; 340/572.4
(58) Field of Search ............................... 340/10.1, 2, 3, 340/572.4, 10.34, 825.64, 825.63, 572.1, 572.2, 10.3, 825.57; 342/42, 44, 51

(56) References Cited

U.S. PATENT DOCUMENTS 3,818,472 A * 6/1974 Mauk et al. ................. 340/280
5,278,563 A * 1/1994 Spiess ............................ 342/44
5,500,651 A * 3/1996 Schuermann ................. 342/42

* cited by examiner

Primary Examiner—Edwin C. Holloway, III
Assistant Examiner—William L Bangachon
(74) Attorney, Agent, or Firm—Dennison, Schultz & Dougherty

(57) ABSTRACT

A detection and reading apparatus is provided for detecting the presence and reading a coded transponder that moves through a controlled passage. The apparatus is programmed to control a transmitting coil Tx so as to repeatedly emit a transponder detecting electromagnetic field only for a brief interval of the transmission signal period, of minimum duration, but sufficient to allow the transponder to emit a presence signal. When the apparatus receives the presence signal, the transmission coil receives instructions to emit an electromagnetic field of longer duration, sufficient to activate the transponder so that emits its own complete code signal that can be read and decoded. The transmission coil is then instructed to emit a repetitive electromagnetic field that remains of brief duration while the transponder is within the passage and when the transponder presence signal terminates, the detection and reading apparatus rests itself.

9 Claims, 1 Drawing Sheet

APPARATUS AND OPERATIVE METHOD FOR DETECTION AND READING OF TRANSPONDERS IN A CONTROLLED PASSAGE

BACKGROUND OF THE INVENTION

The invention concerns an induction transponder detection and reading apparatus and the operative method through which the transit of the authorized transponders through a controlled passage is detected.

Induction transponder readers, hereinafter called for simplicity "transponder readers", which interact in the controlled passage with the transponders authorized to transit, are already known. Said transponder readers in the first case emit a continuous electromagnetic field and us one or two distinct coils with functions of transmitter and receiver. In the second case they emit a periodic intermittent electromagnetic field and they use two distinct transmitting and receiving coils, or only one coil that is made to operate alternatively as transmitter and receiver. Said coil or coils are placed on the facing sides of the transit passage or are wrapped around the passage to be controlled, while the induction transponder, with which they interact, contains a receiving/transmitting circuit which is stimulated every time it enters the field produced by the transmitting antenna and which interacts with a coded signal which is received by the antenna that acts as a receiver. After the signal has been read and decoded, it is sent to an associated circuit group that has the appropriate functions based on the results which the transponder reader and associated circuit group must reach.

For example, the said associated group, can control the opening of certain gates, it can reduce the discriminating sensitivity of metal detectors (Italian patent n. 1.271.382), it can memorize the number or the code and therefore the person associated with this transponder and the time at which said transit was made, or it can execute other functions. The known transponder readers therefore, allow contact free reading and are also called hands free electronic card readers since they allow the possessor of the authorized electronic card to transit through the controlled passage without having to stop for reading operations which require a physical contact between the card and the apparatus. These types of transponder readers operate in a field of frequencies that are normally between 50 and 450 KHz to allow the use of small sized electronic cards or transponders, with compact internal coils.

The activation of the transponders without internal batteries requires a high intensity value of the electromagnetic field in the whole controlled passage, including the areas that are the furthest away from the antennas. This means that there are high value electromagnetic fields in the proximity of the transmitting antenna, so as to make the transponder readable and maintain the dialogue with it, throughout the controlled passage, even when the transponder is aimed, in respect to the flow of waves from the transmitting antenna, in minimal coupling conditions.

The high intensity of the effective value of the electromagnetic field required to stimulate the transponder, whether it emits a continuous electromagnetic field, or if it emits an intermittent electromagnetic field with the antenna that operates alternately as a transmitter and a receiver, is necessary to activate the electronic card that is enabled by the transponder reader, even when it transits in particularly critical positions of orientation. The known hands free transponder readers require therefore an effective irradiated electromagnetic field value in the controlled passage that is decidedly higher than the limits set by the World Health Organization at 0.66 A/m (at 125 KHz) defined as the electromagnetic field to which the human body can be exposed, even for relatively short periods, without causing damaging effects.

A lowering of the electromagnetic field's effective values, in the controlled passage, to values that are on average lower or equal to those indicated by the World Health Organization would make the authorized electronic cards undetectable, unless these are made to transit in close proximity to the transmitting coil.

SUMMARY OF THE INVENTION

The object of the present invention is to provide a transponder reader structure and a method of managing the electromagnetic field in the controlled passage, which will allow the detection and reading of authorized electronic cards or transponders, with the use of electromagnetic fields with on average a minimal intensity and energy, that is in any case lower than the maximum indicated by the World Health Organization, so that it will not harm people who cross the same controlled passage, even repeatedly, but which in any case will be capable of activating the authorized electronic cards or transponders, which ever way they are oriented, inside the controlled passage in which the detection and reading takes place.

The invention that has made the attainment of these results possible is embodied in a transponder detection and reading apparatus and in the operational method with which its operations are controlled. It consists in a programmed detection-reading apparatus which controls a group that includes the transmitting coil, which is operated repeatedly so that each time it emits a detection electromagnetic field which is sufficiently intense only for a brief interval of the period of the transmission signal, defined also as the presence detection interval, but which is sufficient to permit the detection of the transponders transiting in the controlled passage, irrespective of their orientation, and to make them emit a transponder presence signal. Consequently, following the start of the transit of a transponder in the controlled passage and of the detection of the transponder presence signal emitted by it, when it is invested by the electromagnetic detection field even though briefly, the group which includes the transmitting coil is commanded to emit a prolonged electromagnetic field for a duration interval that is sufficient to completely activate the transponder, defined as the reading interval, so that the transponder emits its own complete coded signal so that it can be read, decoded and recognized. Subsequently, the group which includes the transmitting coil is commanded repeatedly to emit an electromagnetic field that remains brief each time (presence detection interval) for the time in which the identified transponder remains in the detection space, that is in the controlled passage, so as to obtain from the transponder in transit only the emission of the transponder presence signal. At the termination of the detection of the transponder presence signal in the controlled passage, for a programmed time interval, the apparatus, which controls the group that includes the transmitting coil, resets itself to control this group again and allow the detection and reading of a new transponder in transit. The advantages offered by the invention consist in the fact that for each transmission period of the transponder detection-reading apparatus, only for a small fraction of this (presence detection interval) do we have a noticeable irradiation of electromagnetic waves and therefore of energy in the controlled passage, whose effective value, in relation to the entire period, move decidedly towards zero, therefore towards a value that, operating on the emission intervals and on the transmission period of the group including the transmitting coil of the transponder detection-reading apparatus, can be led to a value that is much lower than the maximum value indicated by the World Health Organization.

One of the elements of the invention involves discovery that brief intervals of emission of an adequately intense electromagnetic field (presence detection intervals) are sufficient to make the transiting transponder emit a presence signal, whose first detection commands the circuit including the transmitting coil of the transponder detection and reading apparatus to emit an electromagnetic field of longer duration, that is sufficient to completely activate the transponder (reading interval) so that its emits the whole coded response signal. The reading of the latter, by means of the receiver circuit of the transponder detection-reading apparatus, permits the identification of the transponder and therefore allows the issue of successive instructions to the external equipment to be controlled. It also commands the reduction, at least of the duration, of the sufficiently intense electromagnetic field that is emitted by the circuit which includes the transmitting coil of the said detection-reading apparatus, only for the presence detection interval in each transmission period, as long as the transponder remains in the controlled passage. Upon the termination of the reception of the transponder presence signal in the controlled passage, when the transponder has passed through it, the programmed apparatus which controls the activity of the circuit comprising the transmitting coil of the transponder detection-reading apparatus, resets itself and commands this circuit to emit short lasting electromagnetic fields (presence detection intervals) while awaiting to receive the first presence signal from the next transponder in transit.

The described operative method and the programmed apparatus which control the entire transponder detection-reading apparatus therefore allow the activation of the group comprising the transmitting coil only for brief time periods (presence detection intervals), and only for a longer lasting period (reading interval) when the transponder is introduced into the controlled space and emits its first presence signal. On average therefore, only for a brief fraction of the effective period of the transmission signal do we have the emission of an electromagnetic field that is sufficiently intense, with a marked decrease in the effective value of the same in relation to the entire period of the transmission signal, so as to bring it down to a value that is markedly lower than that indicated by the World Health Organization.

BRIEF DESCRIPTION OF THE DRAWINGS

The invention is described in detail hereinafter with the help of a block diagram and Cartesian diagrams given only for examples sake in the enclosed table of which.

DESCRIPTION OF THE PREFERRED EMBODIMENT

Figure 1:
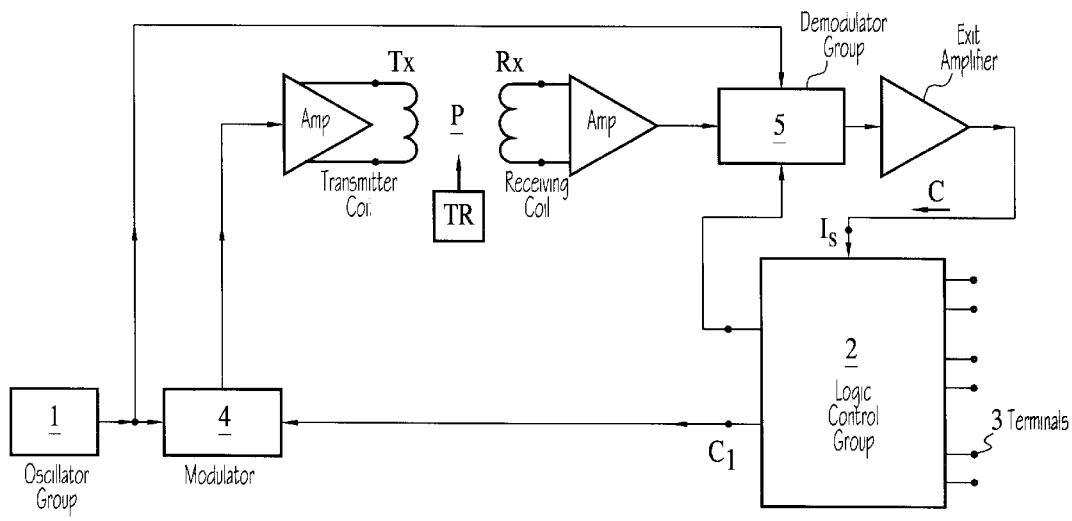
FIG. 1 is a block diagram of the transponder detection and reading apparatus with the programmed apparatus which controls its operating.
Figure 2:
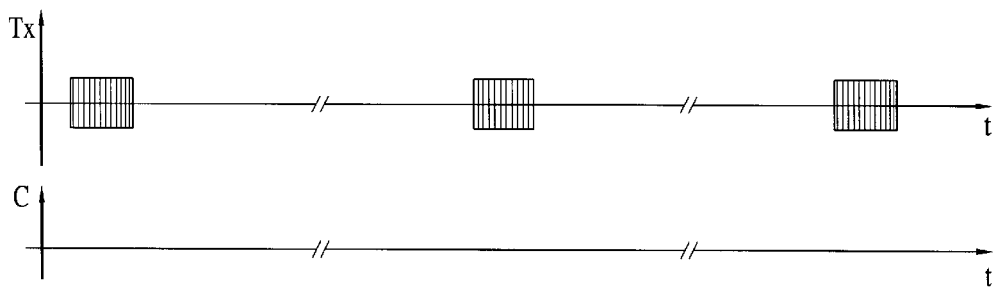
FIG. 2 is a Cartesian diagram which exemplifies in the first case the intermittent electromagnetic field emitted in the brief presence detection intervals by the circuit that includes the transmission coil in the absence of a transponder, while in the second case it indicates the absence, in the receiver of the transponder presence signal, in the corresponding interval.
Figure 3:
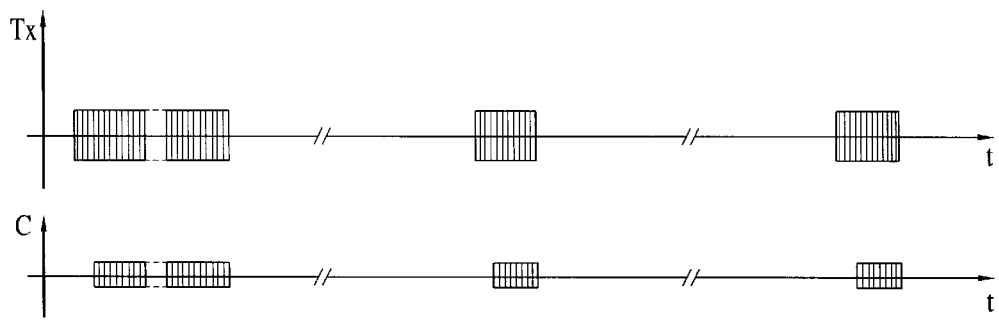
FIG. 3 is a Cartesian diagram showing the electromagnetic field emitted, for a reading interval by the circuit including the transmission coil of the transponder detection-reading apparatus after the reception of the first signal of transponder presence, and of the successive electromagnetic fields emitted for brief presence detection intervals during the presence of the transponder in the controlled passage, as well as the complete "C" coded signal emitted by the activated transponder and of the successive transponder presence signals emitted by the same.

It is understood that the drawings are exemplary only: that of FIG. 1 with the aim of exemplifying the electronic circuit of the transponder detection-reading apparatus with the programed circuit that controls it, those of FIGS. 2 and 3 with the aim of showing the preferred solution, the variation in time of the electromagnetic field in the controlled passage, therfore the modest quantity of irradiated energy within the transmission periods.

The present invention therfore concerns the transponder detection-reading apparatus in which Tx indicates the transmission coil, Rx the receiving coil, which can be placed facing each other in the transit passage P for the transponder TR or wrapped around the transit passage P for the transponder TR or wrapped around the transit passage or even coinciding in the same coil and operating alternately between each other. 1 indicates the oscillator circuit that is capable of originating the transmission signal, operating normally at 125 KHz, with 4 the modulator that precedes the transmitting coil Tx and with 5 the demodulating circuit following the receiving coil Rx.

The programmed group which controls the functioning of the transponder detection reading apparatus is composed of a Logic Control Group 2, which can be of the cabled or microprocessor type, equipped with, on one side, a series of terminals 3 for its connections with external units, such as a keyboard or other programming apparatus, one or more screens, serial or parallel plugs, for servo-mechanisms, signaling units, etc. depending on how the transponder detection-reading apparatus is used globally, on the other side with a signal entrance coming from through appropriate circuits, from the receiving coil Rx and finally on another side can be equipped with control exits.

The signal entrance "Is" is shown connected to the Rx coil by means of an amplifier group, a demodulator group 5 and finally an exit amplifier. The command exit "C1" is instead connected to the transmission group, comprehending the modulator group 4, fed by the oscillator group 1 and connected through an amplifier group with the transmission coil Tx, so as to control the emission of intense electromagnetic fields respectively for brief time intervals (presence revelation intervals) and for longer time intervals (reading intervals) as well as for the reception of the corresponding electromagnetic fields.

The logic that governs the transponder detection-reading apparatus is the following: the authorized electronic card or transponder, each time it enters the detection electromagnetic field produced by the Tx coil in correspondence with the controlled passage, is excited at least to a level of induced electromotive force—in it—that is sufficient to feed its internal electronic circuit. In these conditions, it emits a transponder presence signal which is distinct and easily recognizable, for its periodicity, from a generic electromagnetic disturbance. The reception of the first transponder presence signal, by the receiving coil Rx, activates the Logic Control Group 2 so that the electromagnetic field produced by the Tx coil is lengthened, at least in the interval in which it is emitted (reading interval) to allow the electromotive force induced in the authorized electronic card to reach the threshold for its complete stimulation, allowing it therefore to emit its complete coded signal and permit its decoding and identification by the receiving group of the transponder detection-reading apparatus and of the Logic Control Group 2.

In the transmission periods following the reception of the transponder presence signal induced in the receiving coil Rx, the circuit including the transmission coil Tx, at least in the preferred embodiment, emits electromagnetic fields for brief intervals (presence detection intervals), sufficient at least to make the authorized electronic card emit the sole presence signal. When the reception of the presence signal ceases for a programmed time interval, that is when the authorized electronic card TR has exited controlled passage P, the Logic Control circuit 2 resets itself and the circuit including the transmitter coil Tx prepares itself to re-transmit an electromagnetic field for a longer time interval (reading interval) as soon as the receiving coil Rx receives a new transponder presence signal, that is the specific signal that all the authorized electronic cards—for transponder detection-reading apparatus—emit when the detection electromagnetic field which invests them has a duration that is barely sufficient to make them emit a transponder signal (presence detection interval).

Herebelow we indicate an example of the operation of a transponder detection-reading apparatus, controlled in its operation by the operative method that is preferred by this invention, in the event in which the signal by which the group is fed including the transmitting coil Tx is periodic and intermittent.

The period of the transmission signal is 500 msec, the emission interval of the detection electromagnetic field by the group including the transmission coil Tx is 5 msec (presence detection interval) and in this 5 msec interval the electromagnetic field in the controlled passage has an amplitude which would correspond to an effective value of 1 A/m. if it were emitted continuously for the entire period.

In these conditions the effective value of the detection electromagnetic field in the controlled passage, referred to the period of 500 msec is of 0,01 A/m, markedly lower than the maximum value of 0,66 A/m indicated by the World Health Organization.

Following the reception of the first transponder presence signal, the circuit including the transmitting coil Tx increases the duration of the emission of the electromagnetic field up to 50 msec (reading interval). In the 500 msec period, which includes said 50 msec period, the effective value of the electromagnetic field becomes 0.1 A/m.

In the controlled passage, in a time interval that is equal to various periods in which we have only an emission of a prolonged magnetic field for a reading interval, the effective value of the electromagnetic field is therefore considerably reduced, guaranteeing total harmlessness to people transiting in the controlled passage.

The Logic Control circuit 2 can be programmed so that the circuit including the transmitting coil Tx of the transponder detection-reading apparatus, in the absence of a correct reading of the coded signal emitted by the transponder transiting in the controlled passage, repeats the emission of the electromagnetic field fort a longer interval (reading interval) sufficient to provoke another emission of the entire coded signal by the transponder in transit in the controlled passage for a maximum of n consecutive times, with n being a programmed whole number, maintaining the electromagnetic field with effective values below the safety levels.

In the absence of a valid reading, the apparatus considers the transiting transponder as non authorized and it ignores it.

In another solution the apparatus could be programmed to repeat for n times the emission of the longer lasting electromagnetic field (reading interval) (with n a whole number bigger than zero) following the reception of the first or of n first transponder presence signals to ensure the correctness of the information received with the reception of the transponder presence signal/s and of the successive coded transponder signals.

The invention may finally undergo variations in the values of time and amplitude of the transmitted signal, while remaining within the method of partialisation to reduce the transmitted electromagnetic energy. In general, therefore, in the method that is the object of the invention, the partialisation of the transmitted electromagnetic energy is aimed at revealing at first the presence of the transponder in transit and, following, to momentarily prolong the duration of the emission for a time that is necessary to read it while operating within the limits of electromagnetic field intensity that are foreseen by safety laws. Said partialisation can be obtained either through the emission of intermittent electromagnetic fields, as in the examples illustrated above, or through the emission of the electromagnetic fields having levels always different from zero, but with modulated amplitudes.

What is claimed is:

1. Detection and reading apparatus for transponders that cross through a controlled passage and which is adapted to reduce the levels of radiation to which a human transponder carrier is subjected, and for operation of external equipment when said apparatus detects a proper transponder code, said apparatus including;
    a) transmitting coil means for emitting radiation across said passage,
    b) receiving coil means for receiving the radiation emitted by said transmitting coil means and installed in a position spaced apart from the said transmitting coil means defining a transit path therebetween,
    c) said transmitting and receiving coil means being adapted to activate a transponder passing through said passage and to read its emissions,
    d) logic control circuit means electronically connected to said receiving coil means, said logic control means having an output connected to said external equipment to be operated,
    e) command output means associated with said logic control circuit being electronically connected to said transmitting coil means,
    f) said transmitting coil means emitting an electromagnetic field periodically for short time intervals in order to detect the presence of a transponder within the passage,
    g) said logic control circuit acting through said command output means upon detecting the presence of a transponder within the passage to activate the transmitting coil means for a longer interval in order to activate and read the transponder code.

2. An apparatus as defined in claim 1 and further including a demodulating circuit and amplifier electrically connected between the receiving coil means and the logic control circuit means.

3. An apparatus as defined in claim 2 and further including a modulator circuit electrically connected between the command output means and the transmitting coil means.

4. A method of controlling a detection and reading apparatus for transponders having coded signals passing through a controlled passageway to reduce the levels of radiation to which a human transponder carrier is subjected, and for operation of external equipment when said apparatus detects a proper transponder code, said apparatus including spaced apart transmission and receiver coils on either side of the passage, a logic control circuit connected to said receiver coil and having output terminals connected to said receiver coil and having output terminals connected to and adapted to operate said external equipment upon receiving a proper coded signal from the transponder, and command terminal means associated with said logic control circuit for controlling emissions from the transmission coil for detecting the presence of a transponder within the passage and for reading in conjunction with said receiver coil the coding on said transponder whose presence has been detected, comprising the steps of;

- commanding the transmitting coil repeatedly to emit an electromagnetic field for the minimum period of time required to cause said transponder to emit a presence response signal,
- commanding the transmitting coil only following the reception by the receiving coil of a transponder presence signal in the passage to emit an electromagnetic field of longer duration and for a sufficiently long interval to cause the transponder to emit its coded signal and to be read by the receiver coil and logic control circuit,
- commanding the transmitting coil subsequent to reception by the receiver coil of the complete transponder coded signal to repeatedly emit an electromagnetic field for a brief duration as long as the identified transponder remains in the controlled passage, and
- resetting the apparatus when the receiving coil ceases to receive a transponder presence signal within the passage within a preselected and programmed time interval.

5. A method of controlling a detection and reading apparatus for transponders as set forth in claim 4 and wherein commanding the transmitting coil repeatedly to emit an electromagnetic field for the minimum period of time required to cause said transponder to emit a presence response signal is sufficiently intense only for a brief interval of time and is sufficient for the transponder passing through the passage regardless of the transponder's position of orientation, to cause emission of a transponder presence signal.

6. A method of controlling a detection and reading apparatus for transponders as set forth in claim 4, and wherein said transmitting coil is commanded so that in the absence of a correct reading of the coded signal emitted by the transponder in the passage, it repeats the emission of the electromagnetic field for a longer interval sufficient to provoke again the emission of the entire coded signal by the transponder for n consecutive times, where n is a whole programmable number.

7. A method of controlling a detection and reading apparatus for transponders as set forth in claim 4, wherein the transmitting coil is commanded so that at the cessation of the reception of the transponder presence signal by the receiver coil, the logic control circuit resets itself and commands it to repeatedly emit detection electromagnetic fields, each of a brief duration until the receipt of a presence signal of the next transponder in transit into the passage.

8. A method of controlling a detection and reading apparatus for transponders as set forth in claim 4, wherein the electromagnetic energy transmitted is partialized to reveal first the presence of the transponder in the passage and second to prolong momentarily the duration of the emission for the time required to read the transponder code.

9. A method of controlling a detection and reading apparatus for transponders as set forth in claim 8, wherein the partialized electromagnetic energy is achieved through modulated amplitudes at non-zero levels of emitted electromagnetic field.

* * * * *